United States Patent
Woodall

(10) Patent No.: US 7,050,390 B2
(45) Date of Patent: May 23, 2006

(54) SYSTEM AND METHOD FOR REAL-TIME FAULT REPORTING IN SWITCHED NETWORKS

(75) Inventor: Thomas R. Woodall, Valencia, CA (US)

(73) Assignee: Raytheon Company, Waltham, MA (US)

( * ) Notice: Subject to any disclaimer, the term of this patent is extended or adjusted under 35 U.S.C. 154(b) by 1014 days.

(21) Appl. No.: 10/054,346

(22) Filed: Oct. 25, 2001

(65) Prior Publication Data
US 2003/0081556 A1    May 1, 2003

(51) Int. Cl.
*H04L 12/26* (2006.01)

(52) U.S. Cl. ...................... 370/217; 370/225
(58) Field of Classification Search ............. 370/217, 370/218, 219, 220, 225
See application file for complete search history.

(56) References Cited

U.S. PATENT DOCUMENTS 6,308,282 B1 * 10/2001 Huang et al. ................ 714/4

FOREIGN PATENT DOCUMENTS

JP    2000307605 A  * 11/2000

* cited by examiner

*Primary Examiner*—Melvin Marcelo
(74) *Attorney, Agent, or Firm*—Leonard A. Alkov; Karl A. Vick

(57) ABSTRACT

A method and apparatus for fault management in a network. A network architecture is disclosed including at least one network switch, several network interface cards, several processors (host) and a network manager. Fault reporting and detection logic is implemented in each switch and in each network interface card. In addition, multiple fault reporting pathways are provided for each switch and each network interface card. As a result, utilizing message exchanges such as Fibre Channel exchange messages, the switch, the network interface cards and the processors (host) are able to autonomously generate and report faults to the network manager. The combined fault reporting enables the network manager to more accurately isolate faults. In addition, because of the autonomous nature of the fault reporting, faults may be detected and corrected prior to the initiation of a communication session.

7 Claims, 7 Drawing Sheets

SYSTEM AND METHOD FOR REAL-TIME FAULT REPORTING IN SWITCHED NETWORKS

BACKGROUND OF THE INVENTION

1. Field of Invention

This invention relates to the field of network management. Specifically, the present invention relates to network fault management.

2. Description of the Related Art

Communications networks are used in a wide variety of military and commercial applications such as avionics applications, medical imaging applications, etc. With the exponential increase of modern day networks, network management has become a significant issue. A typical communication network includes a number of disparate devices (i.e. switches, satellites, various input devices, etc) made by different manufacturers and communicating with different communications protocols. Each of these disparate devices may represent a potential point of failure in the network. In addition, the devices themselves include multiple components such as processors or network interface cards (NIC), therefore each individual device may have multiple points of failure within the device itself.

Typically, network managers are used to monitor, detect, isolate and resolve device faults. Conventionally, network managers are implemented in software in a server placed at a location in the network. Many network devices, such as switches and network interface cards are passive, meaning that the devices only forward messages and do not originate messages. Therefore, a typical network manager will only detect a fault during a communications session or when the network manager loses communication with a portion of the network that includes these devices. As a result, user data may be lost or delayed.

The latency in fault detection is also an issue, since conventional network managers can only detect faults when a communication session is initiated, or when a portion of the network is inoperable. As a result, it becomes more difficult to correlate and isolate faults, especially when several faults occur at the same time. In addition, network managers capable of monitoring network devices at the component level, may not receive communication of a component fault at all, if the failure of the component renders the component/device inoperable or if the fault is in the communication path between the component and the network manger.

A second conventional technique used to manage network failures involves the use of a 'heartbeat protocol'. The protocol is referred to as a 'heartbeat protocol' because it enables the network manager to send out periodic test messages to communications devices in the network. However, heartbeat protocols require network resources. As a result, the more frequent the test message the greater the depletion of network resources. As the size of the network increases and more devices need to be tested, the bandwidth required for the heartbeat protocol increases and the resources available for communication decrease.

Hence, a need exists in the art for a real time network management system that will facilitate the correlation and isolation of faults. There is a further need for a network management system capable of determining a network fault with minimal latency and minimal drain on system resources. Lastly, there is a need for a network management technique that enables the management of disparate devices, including passive devices.

SUMMARY OF THE INVENTION

The method and apparatus of the present invention facilitates the real-time detection, identification and isolation of faults in a switched network, such as the American National Standards Institute (ANSI) Fibre Channel based switched network. The switched network includes a network manager, a plurality of switches, a plurality of network interface cards and a plurality of processors (host). In the method of the present invention the switches, the network interface cards and the processors (host) each generate fault information (e.g. reports or messages). The network manager receives the fault information and is then able to isolate and resolve the fault information in real-time prior to the initiation of a communication session.

Specifically, in the method of the present invention, a switch or a network interface card can each autonomously notify the network manager of a fault condition. In addition, communication processors housed in a switch or on a network interface card, use the switch or the network interface card to autonomously notify the network manager of a fault. Lastly, in the present invention, the host uses the network interface card to notify the network manger of a fault condition.

Both the switches and the network interface cards are able to autonomously notify the network manager of fault conditions because of additional fault detection and reporting logic. In the switch, the fault detection and reporting logic is implemented in a channel logic unit and in a switch logic unit. The fault detection and reporting logic enables the channel logic unit and the switch logic unit to exchange control and fault information. In addition, multiple alternative network pathways are provided for the switch to report a fault generated by the fault detection and reporting logic. The additional fault detection and reporting logic ultimately enables the switch to autonomously identify and report faults.

In the network interface card, fault detection and reporting logic is implemented in a network interface card logic unit. The network interface card logic unit includes both a network fault detection unit and a processor fault detection unit. With the addition of the processor fault detection unit, the network interface card is capable of autonomously reporting processor and processor related faults, as well as network faults. In addition, several alternative network reporting pathways are provided for reporting the faults generated by the network interface card. The additional detection and reporting logic, ultimately enables to network interface card to autonomously identify and report faults.

The present invention addresses a number of fault conditions such as switch faults, network interface card faults, host fault and input/output channel faults just to name a few. Utilizing a Fibre Channel compliant messaging protocol (e.g. implemented using a state machine) the switch is able to determine when a port, connector, processor or interface associated with the switch has gone offline. The switch is then able to autonomously report this information to the network manager for correction. The network interface cards also use a state machine to implement standardized protocols and specifications such as the Peripheral Component Interconnection (PCI) specification. As a result, the network interface card can determine when a processor (host), channel or port associated with the network interface card has moved to an erroneous or faulty state. Using the methodology identified above, processors and interfaces associated with a switch or a network interface card are capable of autonomously generating fault reports/messages.

The network manager is then able to take these separate autonomously generated inputs and isolate a fault before critical data is lost.

In an illustrative embodiment of the present invention multiple Fibre Channel compliant switches are configured in a network. The switches are each coupled to a network manager. Should a switch determine a fault on a port, processor, channel, backplane or remote interface, the switch is capable of autonomously generating a fault message and transmitting the message to the network manager. Since there are a plurality of switches in the network, the network manager is able to isolate the fault by analyzing which switch has reported the fault information. In addition, when multiple switches report a fault condition, the receipt of multiple messages generated by the switches, enable the network manager to isolate the fault to a specific switch. For example, if the network manager receives messages from both switches simultaneously, the network manager is able to determine that there may be a full failure of a communication device or that the connection between the two switches has gone down, etc. The network manager can then reconfigure network traffic to minimize or correct the problem.

Multiple network interface cards are also coupled to the network manager and coupled to the switch. As a result, should a network interface card determine a fault with a port, channel, processor (host) or remote interface associated with the network interface card, the network interface card is capable of autonomously generating a fault message and transmitting the message to the network manager. In addition, multiple pathways available for fault reporting enable the network interface card to communicate the fault whether it occurs in a port, channel, processor (host) or remote interface. Therefore, the network manager can analyze the type of message and the communications path of the message, to isolate the fault with a greater level of specificity than was previously available.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
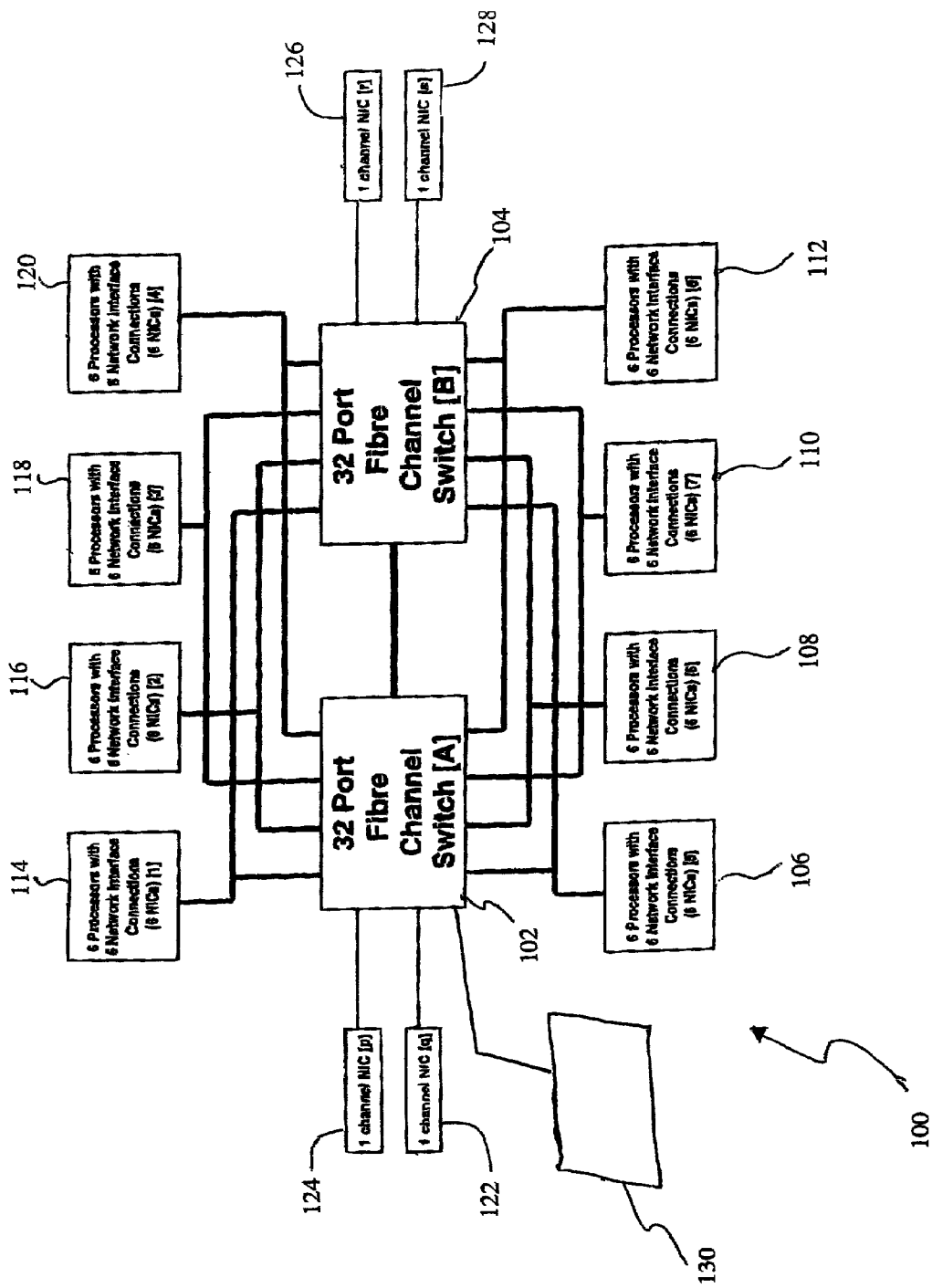
FIG. 1 is a block diagram of a network architecture implemented in accordance with the teachings of the present invention.

FIG. 1 is a block diagram of a network architecture implemented in accordance with the teachings of the present invention. In the illustrative embodiment, a switch based network architecture 100 is disclosed which is compliant with a standard communication specification such as the ANSI Fibre Channel specification. However, it should be appreciated that the methodology of the present invention may be implemented in switching networks that conform to other communications specifications. In the illustrative embodiment of FIG. 1, the switched network 100 includes two switches 102 and 104. Those skilled in the art will appreciate that the present invention is not limited to the number of switches or other components utilized in the network 100.

In the illustrative embodiment, each switch 102 and 104 may be a 32-port Fibre Channel compliant switch. Each switch, 102 and 104, is responsible for switching communications traffic through the network. The communications traffic may be generated from an end-user application, a peripheral device or another communications device within the network. The switches 102 and 104 are connected to several processor boards or nodes 106–120 (even numbers). The processor boards 106–120 typically reside in a communication device however the processor boards may reside in many different types of devices in the network, including end-user interface units. In the illustrative embodiment, each of the processor boards 106–120 includes six independent processors each with an associated memory. The processor boards 106–120 have six network interface connections, at least one dedicated to each processor. In addition, each switch 102 and 104, is connected to each of the processor boards 106–120.

Four channel Input/Output (I/O) devices 122–128 (even numbers) are also displayed. The four channel I/O devices 122–128 provide network connections to peripheral devices such as storage systems, video input devices, etc. Switch 102 is connected to channel I/O devices 122 and 124, while switch 104 is connected to channel I/O devices 126 and 128. In the illustrative embodiment, the switches 102 and 104 are directly connected by six independent connections, as shown at 132. However, it should be appreciated that the switches 102 and 104 may also be indirectly coupled.

A network manager 130 is included which, in the illustrative embodiment, may be a single network manager directly connected to a processor board (106–120) or directly connected to a switch (102 or 104). Alternatively, the network manager may be distributed and remotely coupled to each processor board, each switch or a combination of the two. In addition, a processor board (106–120) may serve as the network manager. As will be appreciated by those skilled in art, the network manager may be implemented with software or in hardware (e.g. logic). In addition, the network manager may further include client server components or peer-to-peer components. For example, the network manager 130 may be a server receiving fault reports or messages from client/agent software or logic that is running on the switch (102 or 104), the processor boards (106–130) or in the channel input/output devices (122–128). Alternatively, the network manager may include multiple peer-to-peer components distributed in different devices in the network, such as the switch, the processor boards, end-user devices, etc.

Figure 2:
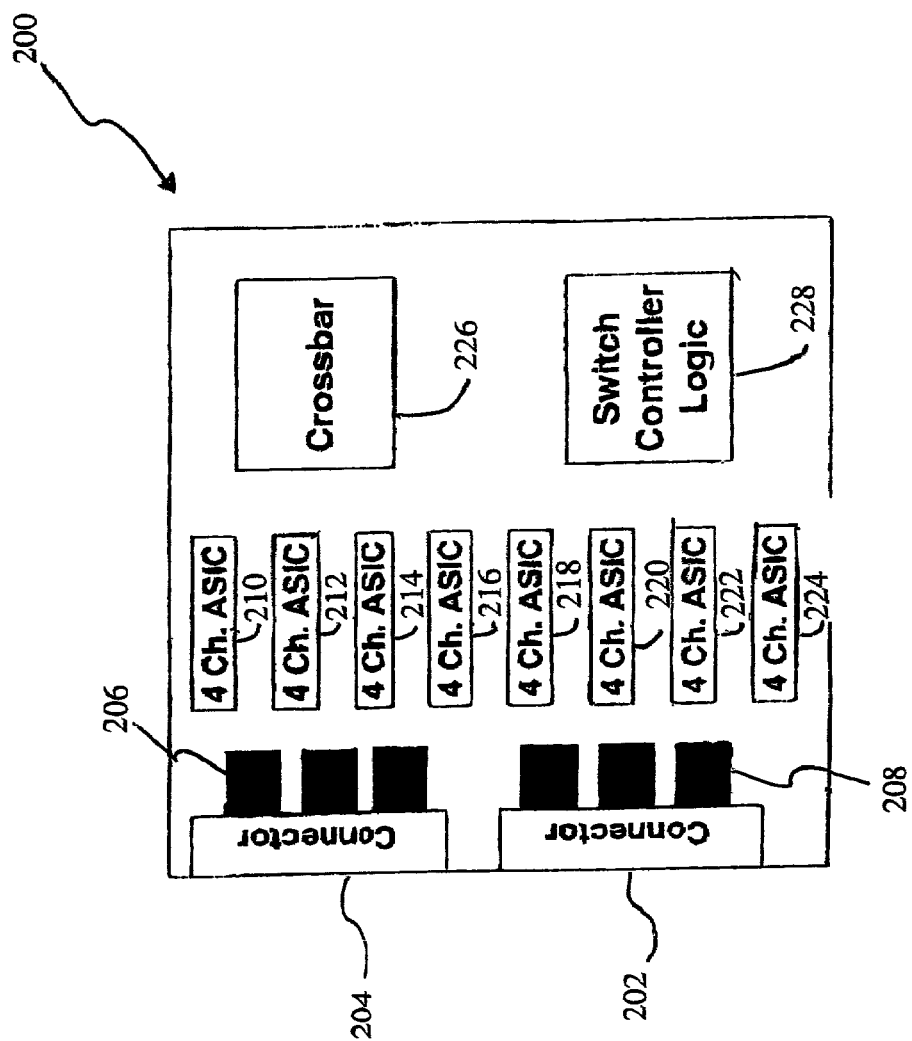
FIG. 2 is a block diagram of a network switch card housed in the switch shown in FIG. 1.

In accordance with the method of the present invention, network fault detection and reporting logic is provided in each switch and in each network interface card. These logic components collect and process data representing system operating functions and/or system performance functions. In addition, the logic components implement routines that facilitate the identification, reporting and isolation of faults at various points in the network. When a fault is detected the affected logic component may be utilized to generate a fault message/report and communicate the fault message/report to a network manager through a predefined path FIG. 2 is a block diagram of a switch card housed in each switch 102, 104 of FIG. 1 in accordance with the present teachings. The switch card 200 includes two connectors 202 and 204. The two connectors interface with a transmitter 206 and a receiver 208, respectively. The transmitter 206 and the receiver 208 are input and output transceivers as is common in the art. The connectors 202, 204 and the transmitter/receiver units 206, 208, interface with eight channel Application Specific Integrated Circuits (ASICs) 210–224 (even numbers). In the illustrative embodiment, each channel ASIC 210–224 manages four channels for a full capacity of 32 channels across the entire switch card 200. A crossbar switch fabric 226 and switch controller logic 228 are a Iso included. All 32 channels use the crossbar switch 226 and the switch controller logic 228. In addition, a number of different types of logic units are provided (not shown). For example port logic units and protocol logic units are also included in the switch.

Additional interfaces and signaling paths (not shown) are also provided in the switch for transmitting fault reporting signals/information between connectors 202, 204 and the various logic units within the switch. As a result, when a fault is detected and reported by a logic unit (e.g. port logic unit, protocol logic unit, switch logic unit), a separate path is provided between and the logic unit and the connectors 202, 204. Therefore, the logic units would have independent paths for communicating the fault out of the switch and to the network manager. For example, a fault may result from overheating of one of the logic unit or a malfunction in the crossbar switch 222. The separate additional interfaces and paths enable the logic units to communicate the fault information using the alternative paths. The paths between the logic units and the connectors are implemented using conventional techniques, such as additional circuit connections, conventional port interfaces between the logic units and the connectors or a conventional bus connection.

The present invention enhances fault isolation by enabling a switch and a network interface card to autonomously generate and communicate fault information (i.e. message or report). The ANSI Fibre Channel specification identifies a number of operating states for compliant systems. Accordingly, when a Fibre Channel compliant switch detects a transition to an offline state (i.e. state where a port/connector of the switch is no longer communicating as defined by the Fibre Channel Specification) on a switch port or with a remote port with which the switches communicating, the switch has detected a communication problem between the switch port and the remote port.

The switch communicates a fault to the network manager by placing a fault detection message/report into a data stream and then sending this message/report across the network to the network manager. For example, when a switch port such as 202 or 204 of FIG. 2 transitions to an offline state the switch controller logic 228 will note this transition. The switch controller logic 228 will then send a Fibre Channel exchange (e.g. Fibre Channel specification single class three exchange) message through a second predefined switch port that is not in the offline or faulty state. The second predefined switch port is configured by the network manager in advance. The network manager will then receive notification of the fault condition when the Fibre Channel exchange message routes through the second predefined switch port to the network manager. After the network manager receives the rerouted message, the network manager can take action to correct or work around the problem, e.g. change the network traffic pattern so that the user data can take another path.

In addition to the hardware, standards based system and network software is also implemented in the switch so that fault notices can be transmitted and received reliably. The system and network software enables the reliable transmission and reception of fault messages/reports that are placed in a data stream (e.g. network traffic). The algorithm for the software is dependent on the topology of the network (e.g. switched topology, ring topology, bus topology), the lower level protocols (e.g. Gigabit Ethernet, Fibre Channel) and the higher level protocol (e.g. Transmission Control Protocol/Internet Protocol).

Figure 3:
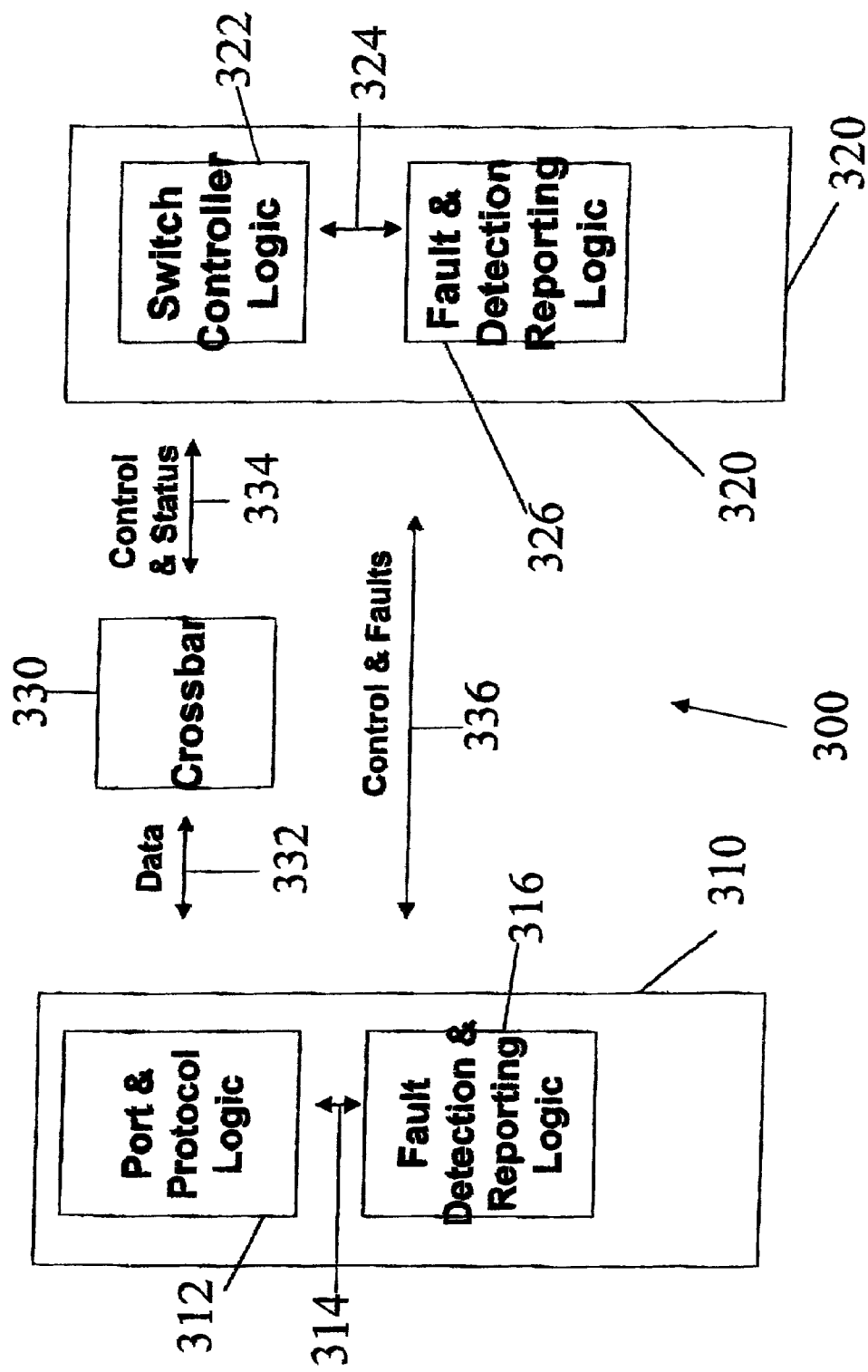
FIG. 3 is a block diagram of the logic implementation of the network switch card displayed in FIG. 2.

FIG. 3 is a simplified block diagram of the switch logic 300 associated with the switch card 200 of FIG. 2. In FIG. 3 a channel logic unit 310 includes a port and protocol logic unit 312 for managing data information traveling through the ports of the switch 102 or 104 of FIG. 1. Port and protocol logic unit 312 is in two-way communication as shown at 314, with a channel fault detection and reporting logic unit 316. An individual channel logic unit 310 is provided for each channel in a switch. Therefore, in the illustrative embodiment, switch card 200 of FIG. 2 would require 32 channel logic units 310 of FIG. 3. A switch control logic unit 320 is also displayed. One switch control logic unit 320 is provided per switch. The switch control logic unit 320 includes switch controller logic 322 which is in two-way communication as shown at 324, with a switch fault and detection reporting logic unit 326. Data is communicated, as shown at 322, between the channel logic unit 310 and a crossbar 330. Control and status information as shown at 334, is communicated between the switch control logic unit 320 and the crossbar 330.

In the illustrative embodiment, the addition of the channel fault detection and reporting logic unit 316 and the switch fault detection and reporting logic unit 326 (e.g. collectively or individually referred to as switch fault units), enables the communication of two-way control and fault information as shown at 336, between the channel logic unit 310 and the switch logic unit 320. The two-way communication of control and fault information 336, enables the switch 102 or 104 of FIG. 1, to autonomously detect and report fault information. With the addition of the channel fault detection and reporting logic unit 316 and the switch fault detection and reporting logic unit 326, a switch is capable of determining whether a fault has occurred on channel logic unit 310 which includes the port and protocol logic unit 312; or in the switch control logic unit 320 which includes the switch controller logic unit 322. In addition, the two-way data communication path, provided for the control and fault information 336, the data 332, and the control and status information 334, enables the switch to communicate the fault information through different pathways within the switch and across the network to the network manager.

As a result of the addition of the channel fault detection and reporting logic unit 316 and the switch fault detection and reporting logic unit 326, when a specific component of the switch becomes inoperable, there are several different options for detecting and communicating the fault. For example, the port and protocol logic unit 312 or the switch controller logic 322 may have a fault. Alternatively, the data 332, or control and status information 334 may have errors. In both situations, the port and control logic 312 and the switch controller logic 322 may communicate this information through the two-way communication paths 314 or 324 respectively, to the channel fault detection and reporting logic unit 316 or to the switch fault detection and reporting logic unit 326. Depending on which unit has the fault, control and fault information 336 may be communicated to the channel logic unit 310 or the switch control unit 320 and then communicated out of the switch to the network manager.

Figure 4:
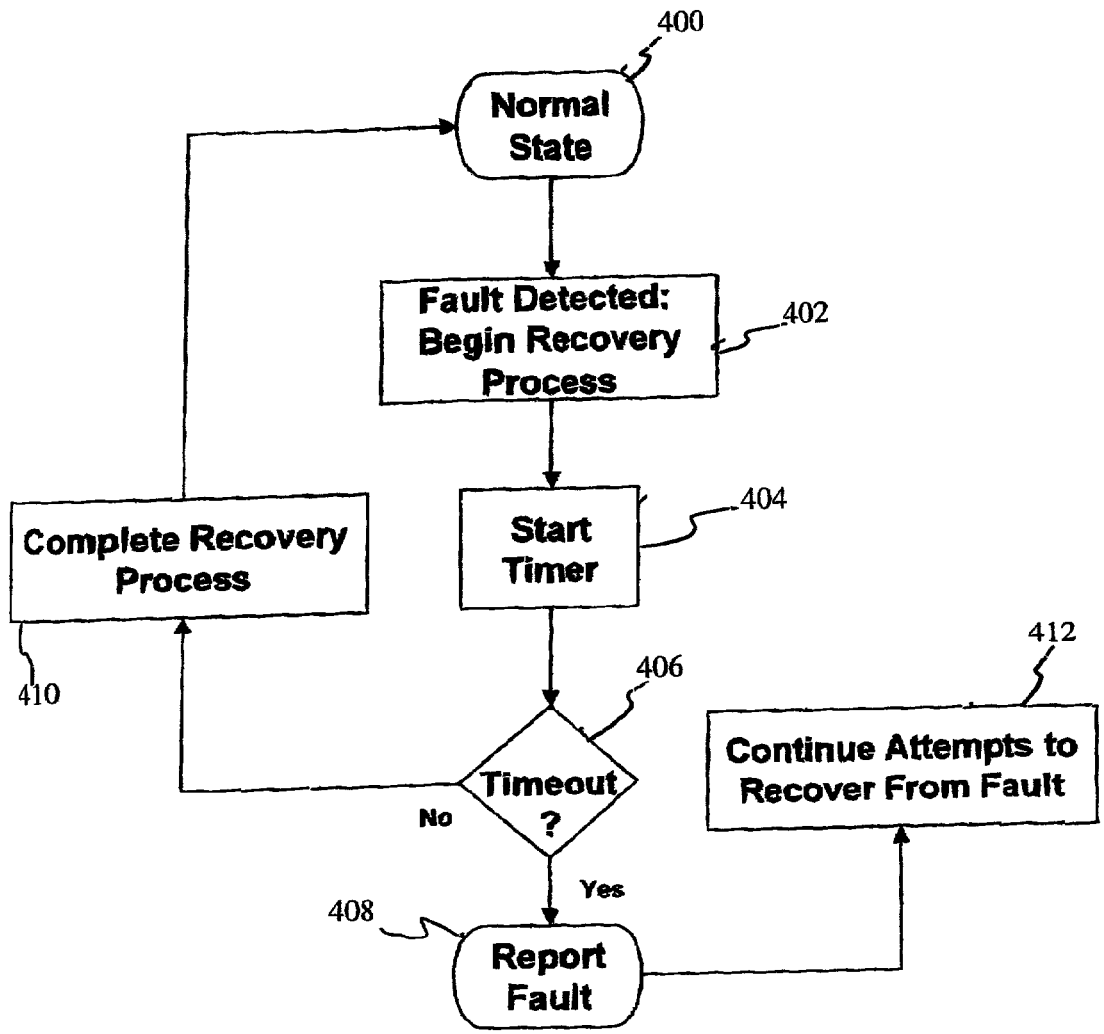
FIG. 4 is a flow chart of the fault and detection reporting logic of FIG. 3.

FIG. 4 displays a flow diagram of the fault detection and reporting logic displayed in FIG. 3. The switch includes a number of logic units, including port logic units, protocol logic units and switch controller logic units. In the illustrative embodiment, a channel fault detection and reporting logic unit is associated with the port and protocol logic units, while a switch fault detection and reporting logic unit is associated with the switch controller logic unit. However, it should be appreciated that the reassignment of logic units to different fault detection and reporting units is within the scope of the present invention as well as a different distribution or number of fault detection and reporting logic units. In addition, in the illustrative embodiment, a flow diagram of the fault detection and reporting logic is implemented using the Fibre Channel protocol.

The fault detection and reporting logic units in the switch, start at a normal state as shown at 400. If there is a fault in the switch, such as a loss of signal at a port of the switch, a loss of synchronization with data communicated to the switch, corrupt data reaches the switch or a loss of heartbeat communication with the switch, the fault detection and reporting logic will move from a normal state to a fault detected state 402. During the fault detected state 402, standardized protocols and algorithms implemented in the switch, will be used by the switch to attempt to recovery from the fault. In the event that the switch is unable to recover from the fault a timer is started as shown at 404. The timer gives the switch the necessary time to recover from the fault. However, depending on the nature of the fault (e.g. signal loss), the timer may be set to zero. Depending on whether the switch times out or not, there are two different alternatives. If the switch is able to make a complete recovery from the fault as shown at 410, before the timeout, the switch goes back to the normal state 400. If the switch is unable to recover before the timeout, the fault is reported to the network manager as shown at 408. After the switch reports to the network manager, the switch once again attempts to recover from the fault as shown at 412.

Figure 5:
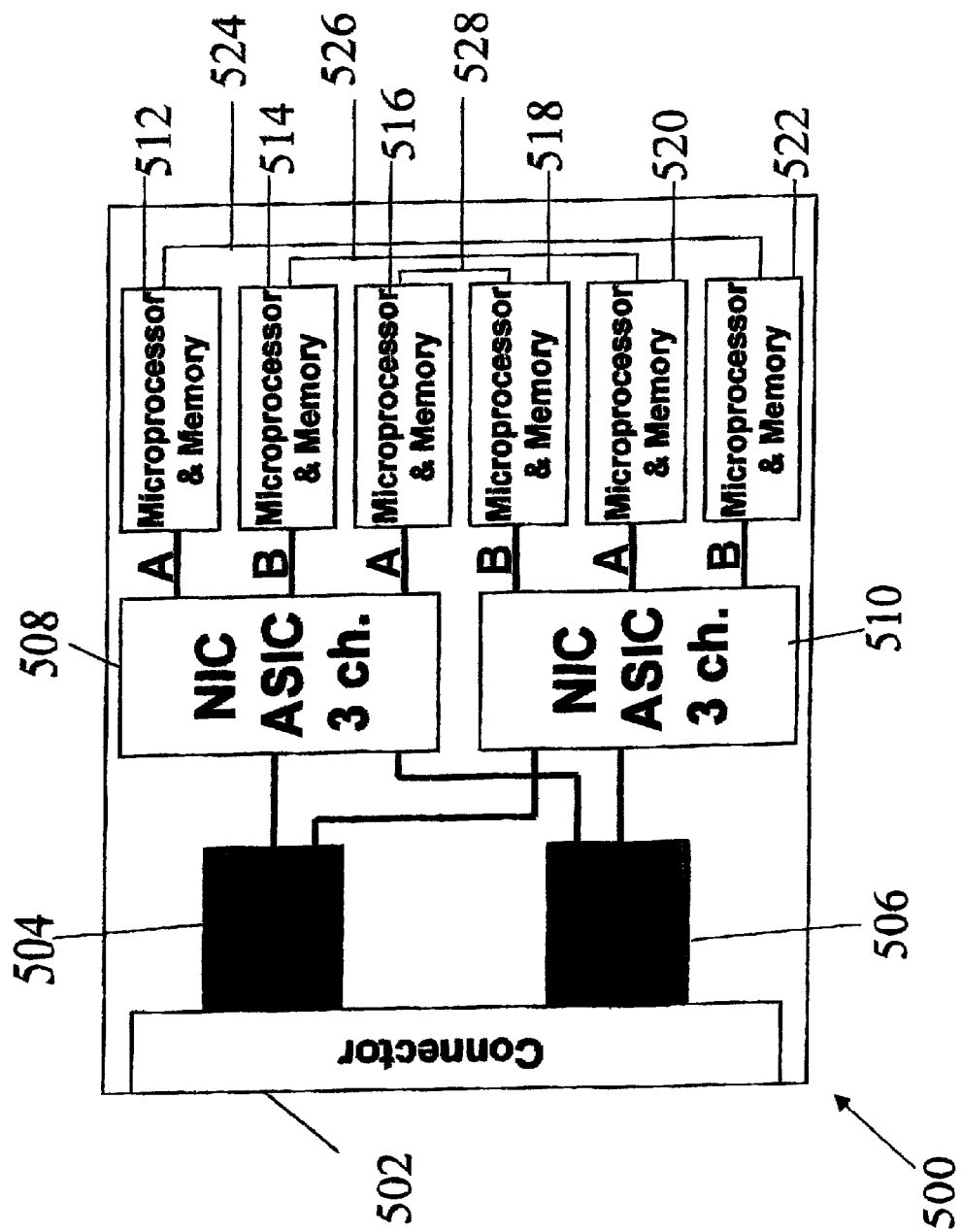
FIG. 5 is a block diagram of the network interface card shown in FIG. 1.

FIG. 5 displays a more detailed block diagram of one of the eight-processor boards 106–120 of FIG. 1. In FIG. 5 processor board 500 includes a connector 502. The connector 502 interfaces with a receiver 504 and a transmitter 506. Two network interface card ASICs 508 and 510 are coupled to the receiver 504 and the transmitter 506. The network interface card ASICS 508 and 510 provide the logic for the network interface cards discussed in FIG. 1 (i.e. 106–120). In the illustrative embodiment, each network interface card ASIC is connected to three of the six processors 512–522 (even numbers). It should be noted that in the illustrative embodiment, each processor 512–522 has an associated memory unit, however, in an alternate embodiment the processors may use a shared memory or have a combination of shared and dedicated memories.

The network interface card ASIC 508 is connected to processors 512, 514 and 516, while network interface card ASIC 510 is connected to processors 518, 520 and 522. Each network interface card ASIC 508 and 510, supports three communications channels (e.g. a channel for each connected processor). It should be appreciated that the network interface card ASICS 508 and 510 may be directly connected to the processors, indirectly coupled to the processors or some combination of the two. It should also be appreciated that the network interface card ASICS and the processors, may be coupled through a backplane based on a standardized specification such as the PCI specification. For example, in the illustrative embodiment, processor 512 is connected to processor 522; processor 514 is connected to processor 520 and processor 516 is connected to processor 518 across a PCI complaint bus or backplane. Without this bridging, each processor would be limited to communication through the network interface card ASICS 508 and 510. The bridging across the PCI bus provides an alternative path for communication should one of the network interface card ASICs fail or becomes inoperable for any reason.

It should be noted that in the illustrative embodiment, each switch 102, 104 of FIG. 1 is coupled through the network interface card ASICs to three processors. For example, switch 102 is coupled through network interface card ASICs 508 and 510, to processors 512, 516 and 520. Switch 104 is coupled through network interface card ASIC 508 and 510 to processors 514, 518 and 522.

The present invention enables the network manager to differentiate between whether a fault is generated by a port on a switch, a network interface card connected to the switch or a processor connected to the network interface card. Referring to FIG. 5 since the network interface card ASICs 508 and 510 on the processor board 500 are both connected to processors 512–522, the network manager will be able to isolate a fault to a processor 512–522. The network manager can isolate a fault in the processor 512–522 utilizing redundant paths 524, 526 and 528. The redundant paths enable a first processor 512–522 to send fault messaging to a second processor across an alternative connection (e.g. PCI bus/backplane), thereby avoiding a faulty communications path. The second processor could then communicate the fault to the network manager.

In the illustrative embodiment additional features are also implemented to enable the network interface card to perform autonomous fault reporting. Therefore, instead of having distributed processing and control between the network interface logic and the host, several important functions are consolidated in the network interface card to enable to network interface card to autonomously report faults. A Direct Memory Access (DMA) controller is provided for quick memory access to address faults in real-time. All software such as data structures, required for sending the fault reporting messages is located in network interface card. The logic that monitors the host (processors) and detects failures also resides in the network interface card. Control logic that sends fault notification to the network resides in the network interface card. Finally, the network manager is configured to receive fault reports that are generated from the network interface card.

The methodology disclosed in the present invention enables a network manager to determine whether the switch has failed, whether a network interface card has failed or whether a processor has failed. Isolating the faults at this level of granularity, enables the network manager to determine whether an intermediate device that is forwarding the communication has failed or whether the end user device has failed. While the immediate response to the fault may be the same (e.g. move the function to a new port or interface), the ability to differentiate the fault may influence further diagnostic decisions (e.g. maintenance) related to whether the problem is generated by hardware or software.

In the illustrative embodiment, just as the switch and the network interface card can autonomously generate a fault message, a processor (host) connected to the network interface card may also autonomously generate a fault message/report. In the present embodiment, the network interface card is couple d to the processor (host). The network interface card detects faults generated by the processor (host) connected to the network interface card. Typically these faults will be communicated directly to the network interface card, however, when the communication path to the network interface card is inoperable, the fault may be communicated across the PCI compliant backplane. The PCI standard like the Fibre Channel standard is also implemented using a state machine. Therefore, the network interface card is alerted to faults in the network by detecting erroneous states between the network interface card and the processor (host), either in the PCI protocol or in a higher level protocol defined between the NIC and the processor (host). For example, an event queue may overflow with events, e.g. send complete, receive, etc. If the network interface card detects a queue full/overflow condition this may indicate that the host has stopped functioning properly. This condition would be considered a fault condition because information will be lost without the host knowing about the lost events. Using the methodology of the present invention, when the network interface card detects the fault condition, it can send a Fibre Channel Exchange (e.g. message) to the network manger. The network manager can configure the network to direct this communication through a switch to the network manager or utilize another system control function to redirect the traffic elsewhere. Therefore, utilizing a combination of the PCI based state machine, potentially including a higher level protocol, and the Fibre Channel Exchange messaging, the network interface card is capable of autonomously generating a fault message related to a processor (host) coupled to the network interface card.

Figure 6:
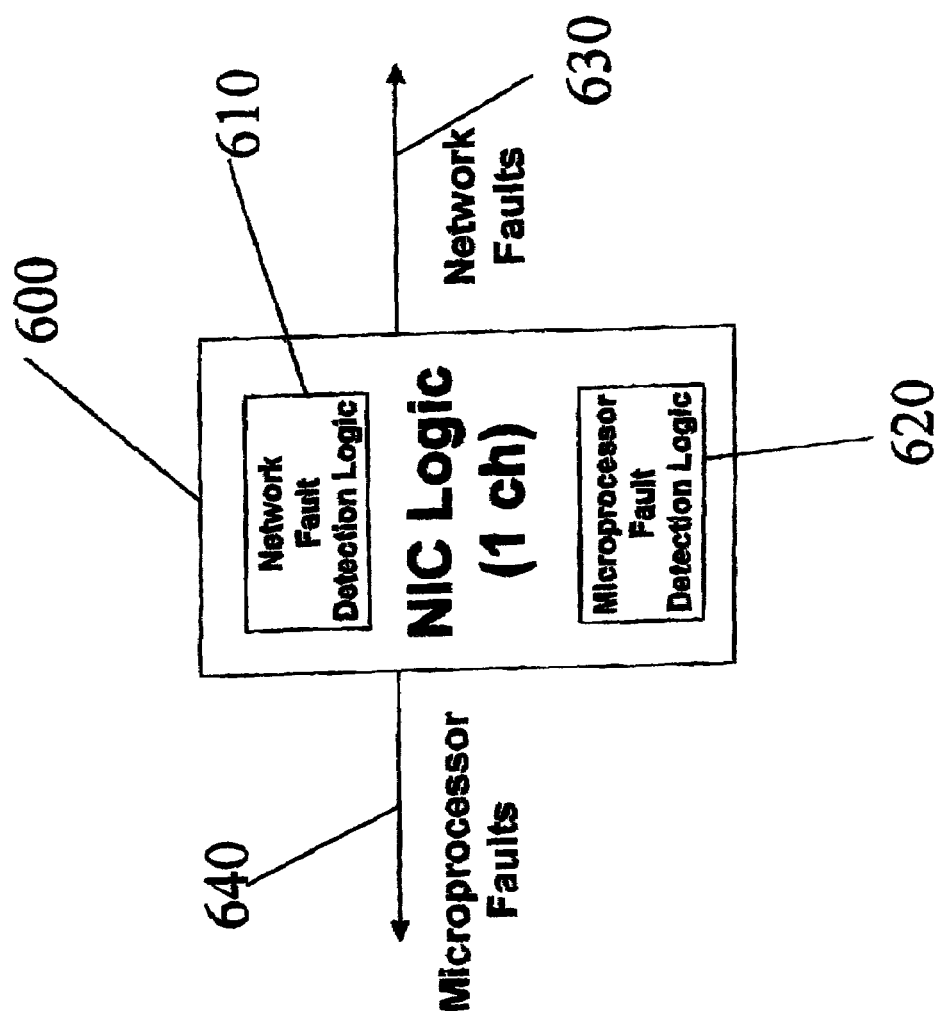
FIG. 6 is a block diagram of the logic implementation of the network interface card shown in FIG. 5.

FIG. 6 is a block diagram highlighting the logic associated with a network interface card implemented in the present invention. The network interface card logic 600 includes network fault detection logic 610 for detecting network related faults. It should be appreciated that in the illustrative embodiment, there is separate network interface card logic for each communication channel. The network interface card logic 600 also includes processor fault detection logic 620. The processor fault detection logic enables the network interface card logic 600 to detect processor faults that were previously undetectable by the network fault detection logic 610. In the example given above, where the event queue filled with events, e.g. send complete, receive, etc, the processor fault detection logic 620 would detect and report this fault.

In addition, in the illustrative embodiment, two independent pathways are established for the communication of faults. For example, if there is a fault in the network, it may not be feasible to send network fault reports generated by the network fault detection logic 610 across the network, therefore the network fault report (e.g. network fault message) may be sent out across an alternate pathway as shown at 630. The alternate pathway may be a PCI compliant backplane as mentioned above. On the other hand, as a result of a fault in the PCI compliant backplane, a processor fault report (e.g. processor fault message) generated by the processor fault detection logic unit 620, may be sent out across the network as shown at 640.

The two fault detection units, one for network faults (e.g. network fault detection logic unit, 610) and one for processor faults (e.g. processor fault detection unit 620), enable the network interface card logic 600 to report faults associated with the network or with the processor. In addition, as a result of the separate pathways (output ports, 630, 640) available for communicating these faults, the network interface card is capable of the autonomous generation and communication of faults to the network manager.

Figure 7:
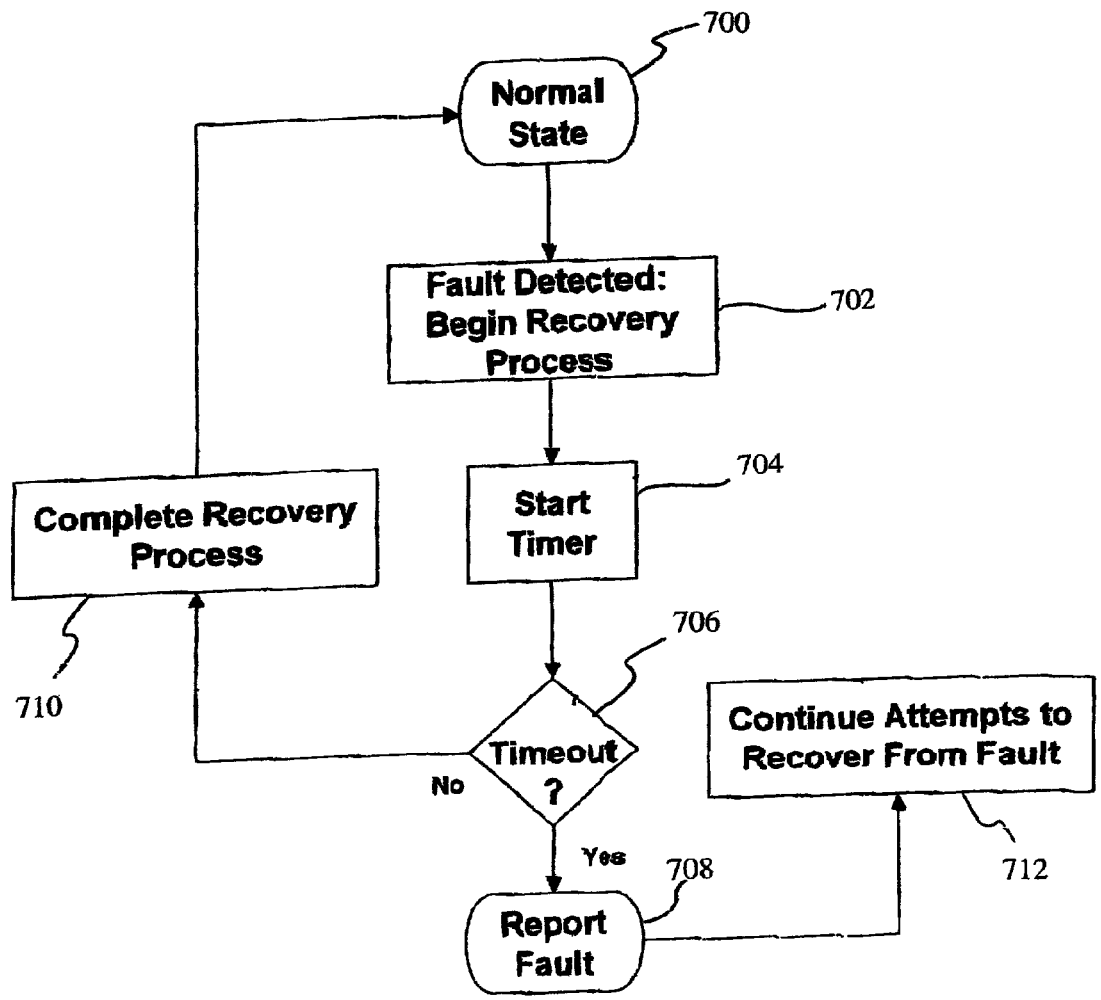
FIG. 7 is a flow chart of the fault and detection reporting logic of FIG. 6.

FIG. 7 displays a flow diagram of the fault detection and reporting logic displayed in FIG. 6. In the illustrative embodiment, the network interface card logic unit includes both a network fault detection logic unit and a processor fault detection logic unit. In the illustrative embodiment, the flow diagram associated with the processor fault detection logic unit is implemented using a standard protocol such as the PCI protocol.

In the network interface card logic both the network fault detection logic unit and the processor fault detection logic unit operate in a normal state as shown at 700. If there is a fault in the network interface card, such as a loss of signal at a port of the network interface card, a loss of synchronization with data communicated to the network interface card, corrupt data reaches the network interface card or a loss of heartbeat communication with the network interface card, the network fault detection and reporting logic will move from a normal state to a fault detected state 702.

In the alternative, if there is a fault in a processor (host), such as a loss of signal at a port of a processor (host), a loss of synchronization with data communicated to a processor (host), corrupt data reaches the processor (host) or a loss of heartbeat communication with the processor (host), the processor fault detection and reporting logic will move from a normal state to a fault detected state 702. During the fault detected state 702 standardized protocols and algorithms implemented in the network interface card logic, will be used to attempt to recovery from the fault. In the event that the network interface card logic is unable to recover from the fault a timer is started as shown at 704. The timer gives the network interface card logic the necessary time to recover from the fault. However, depending on the nature of the fault (e.g. signal loss), the timer may be set to zero. Depending on whether the network interface card logic, times out or not, there are two alternatives. If the network interface card logic is able to make a complete recovery from the fault as shown at 710, before the timeout, the network interface card logic goes back to the normal state 700. If the network interface card logic is unable to recover before the timeout, the fault is reported to the network manager as shown at 708. When there is a network fault the network fault detection logic located in the network interface card logic unit may report the fault using a local PCI based connection or an Ethernet connection since the fault reported by the network fault detection logic would typically indicate a fault with the network. When there is a processor (host) fault the processor fault detection logic will typically utilize the network to report this fault since the fault reported by the processor (host) may preclude using the PCI based communication to report the fault to the network manager. After the network interface card logic reports to the network manager, the network interface card logic once again attempts to recover from the fault as shown at 712.

To illustrate the methodology of the present invention a number of common faults are addressed below:

(1) Single or multiple connections are loss between a processor board 106–120 of FIG. 1 and a switch 102 or 104 of FIG. 1. In this scenario both the processor boards 106–120 and the affected switch 102 or 104 of FIG. 1 will detect the fault and will report the fault to the network manager, 130 of FIG. 1. Since both the processor boards and the affected switch report the fault, the network manager can isolate the fault to the path between the specific processor board and the affected switch.

(2) Single or multiple connection (132 of FIG. 1) loss between the switches 102 and 104 of FIG. 1. In this scenario both switches report the fault immediately and simultaneously provide fault reporting to a network manager. Once the network manager has received the fault message, reconfiguration of the communication path is possible thereby mitigating or eliminating the impact due to the presence of the fault. It should be noted that within the context of the present invention, simultaneous fault reporting may occur within a time that is anywhere from several microseconds to several seconds, since network traffic or hardware issues may cause signals or messages to be delayed. In addition, simultaneous fault reporting may not only refer to the reception of the fault information at the network manager, but simultaneous fault reporting could be implemented by placing a similar time stamp on the fault information when the fault information is generated by the switch (102, 104). The network manager would then be able to determine that the messages where generated at a similar time.

(3) Connection loss between an I/O channel interface 122, 124, 126, 128 of FIG. 1 and a switch 102 or 104 of FIG. 1. The switch is able to identify a fault on one of its ports and immediately reports the fault as a fault in the I/O channel. As a result, the network manager is able to detect and isolate the fault before data is sent and possibly lost.

(4) Connector fault—(502 of FIG. 5). In this scenario both switches 102 and 104 of FIG. 1 will simultaneously report the fault. In addition, each switch will see multiple faults. The simultaneous transmission of the fault report from both switches in conjunction with multiple faults appearing at each switch, will lead the network manager isolate the fault the affected network interface card.

(5) Transmitter/Receiver fault (504, 506 of FIG. 5). Both switches 102 and 104 of FIG. 1 once again will simultaneously report the faults. In addition, each switch will see multiple faults. The simultaneous transmission of the fault report from both switches in conjunction with multiple faults appearing at each switch will lead the network manager isolate the fault to the transmitter 506 or the receiver 504.

(6) Network Interface Card ASIC fault (508, 510 of FIG. 5) impacting one channel or total component failure impacting all channels. The switch 102 or 104 of FIG. 1 will report the fault nearly simultaneously with the processor (512–522) detecting the fault thereby enabling the detection of the fault. If the processor has an alternate path (e.g. such as a PCI bus path) it can report the fault using the alternate path, this will enable the network manager to isolate the fault to the network interface card rather than the processor.

(7) Processor fault or Software fault that causes a network channel interface card (122, 124, 126, 128 of FIG. 1) to lose communication with a processor. The network interface card will immediately report the fault utilizing the switch to notify the network manager. In this scenario, the switch would have been pre-configured by the network manager to operate in this way.

(8) Connector failure in the switch (202, 204 of FIG. 2). All the channels (210–224 of FIG. 2) connected via the failed connector will immediately report faults.

(9) Switch Transmitter/Receiver (206, 208 of FIG. 2) fault. All connected channels will report the faults for all affected channels simultaneously. This would be a combination of autonomous switch fault reports and autonomous network interface card fault reports. The simultaneous fault reporting allows for optimal decision making regarding how to reconfigure or degrade operations in the presence of the fault.

(10) Switch/Crossbar logic (226, 228 of FIG. 2) fault. All connected channels will report the faults for all affected channels simultaneously. This will result in a combination of autonomous switch fault reports and autonomous network interface card reports. Once again, the simultaneous fault reporting allows for optimal decision making regarding how to reconfigure or degrade operations in the presence of the fault.

(11) Switch/Crossbar logic (226, 228 of FIG. 2) fault. This type of fault would result in the failure of one or more channels. As a result, all connected channels will report the faults for all affected channels simultaneously. This will result in a combination of autonomous switch fault reports and autonomous network interface card reports. Once again, the simultaneous fault reporting allows for optimal decision making regarding how to reconfigure or degrade operations in the presence of the fault.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A network interface card comprising:
   network fault detection logic generating network fault information;
   processor fault detection logic generating processor fault information;
   a first pathway communicating the network fault information generated by the network fault detection logic; and
   a second pathway, separate from the first pathway, the second pathway communicating the processor fault information generated by the processor fault detection logic.

2. A method of operating a network interface card comprising the steps of:
   generating network fault information;
   generating processor fault information;
   communicating the network fault information using a first pathway; and
   communicating the processor fault information using a second pathway separate from the first pathway.

3. A network interface card comprising:
   means for generating network fault information;
   means for generating processor fault information;
   a first means for communicating the network fault information; and
   a second means separate from the first means, the second means for communicating the processor fault information.

4. A method of isolating a network interface card fault, the method comprising the steps of:
   receiving network fault information;
   receiving processor fault information; and
   isolating the network interface card fault in response to the network fault information and in response to the processor fault information.

5. A method of isolating a switch fault comprising the steps of:
   receiving first fault information generated by a first switch fault unit;
   receiving second fault information generated by a second switch fault unit; and isolating the switch fault in response to the first fault information generated by the first switch fault unit and in response to the second fault information generated by the second switch fault unit.

6. The invention of claim 5 wherein the first switch fault unit and the second switch fault unit are located in a single switch.

7. The invention of claim 5 wherein the first switch fault unit and the second switch fault unit are located in a different switch.

* * * * *